Figure 1:
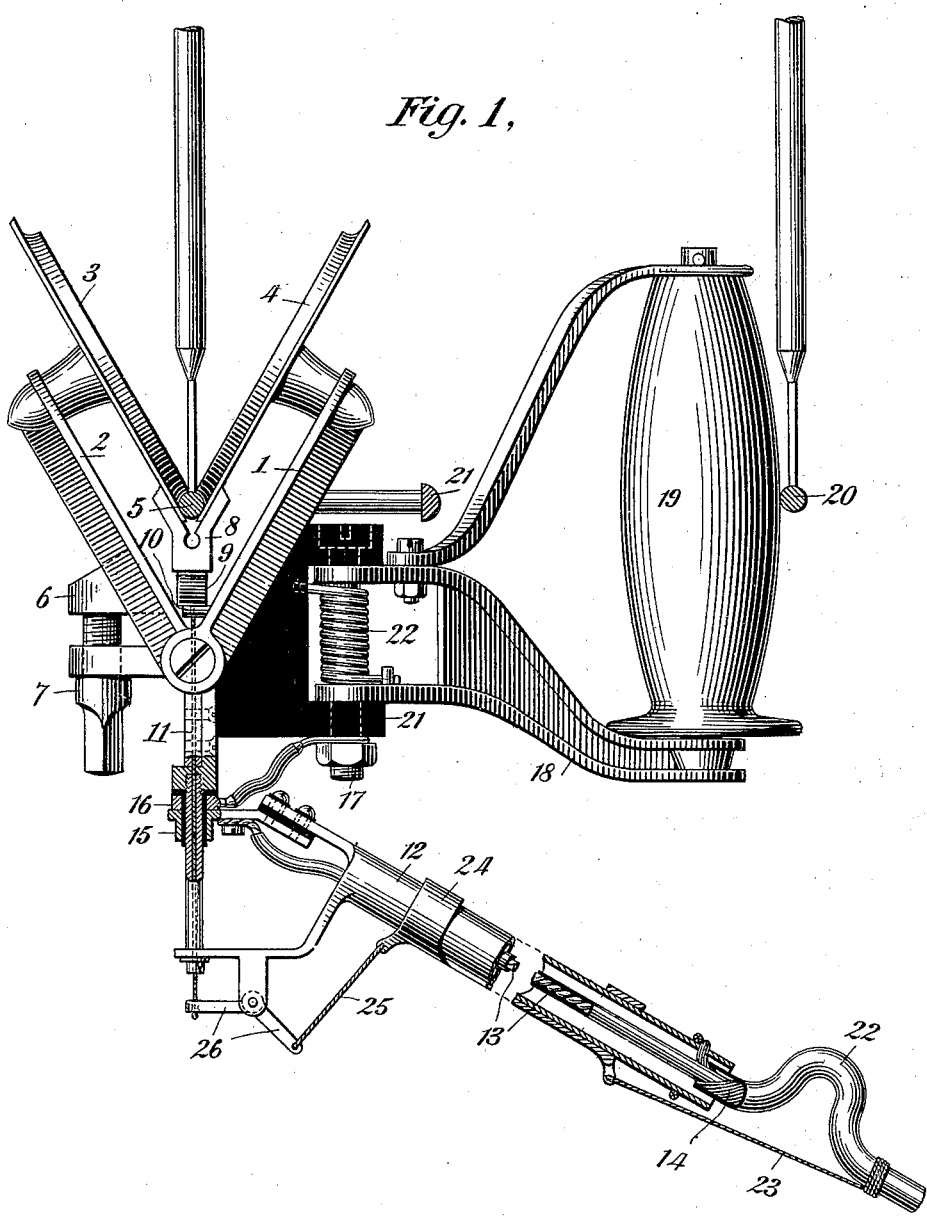

No. 628,968. Patented July 18, 1899.
H. VAN HOEVENBERGH.
ELECTRIC LOCOMOTION.
(Application filed Aug. 31, 1897.)

(No Model.) 2 Sheets—Sheet 1.

WITNESSES:
C. E. Ashley
H. W. Lloyd

INVENTOR:
Henry Van Hoevenbergh
By his Attorney

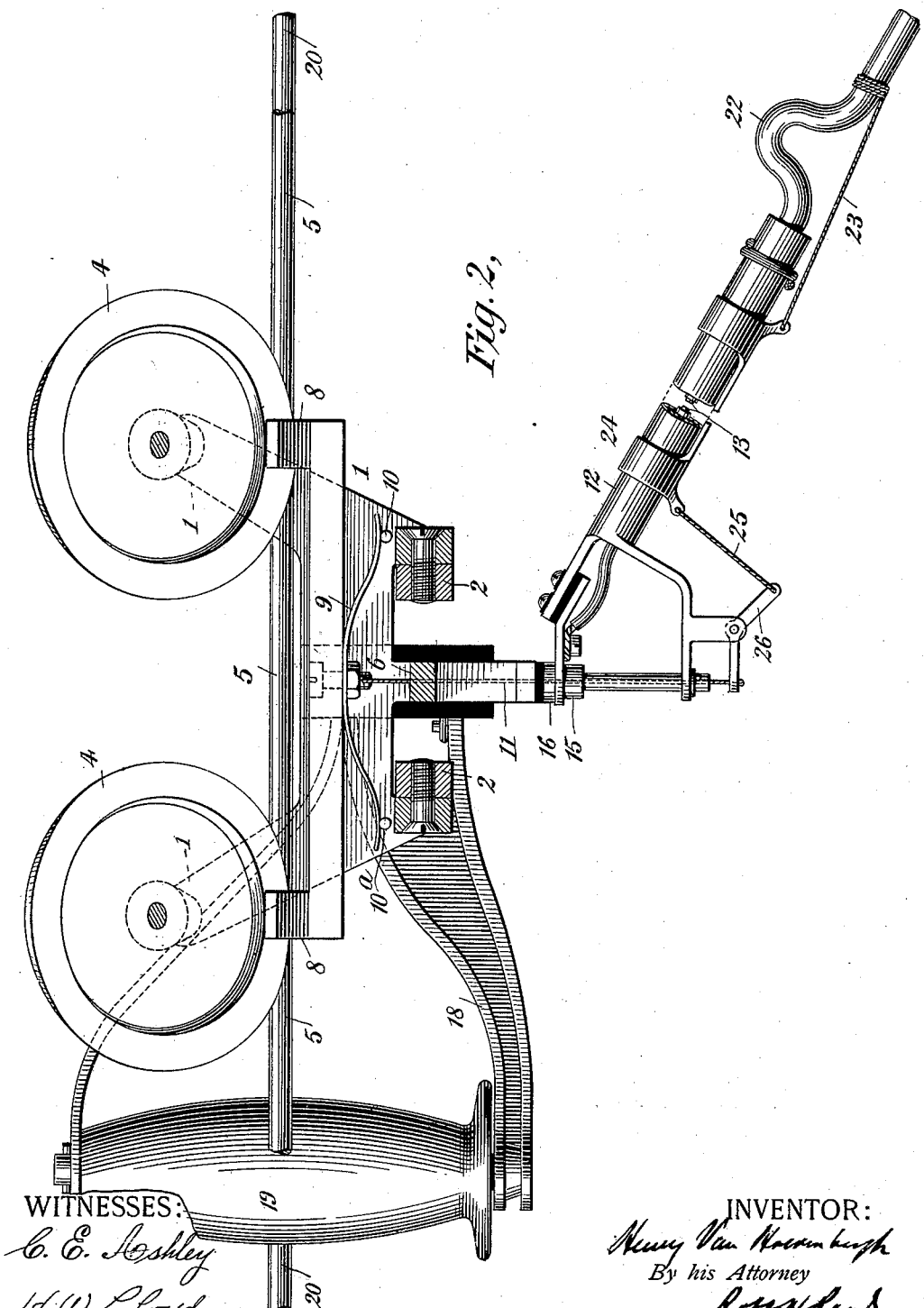

United States Patent Office.

HENRY VAN HOEVENBERGH, OF NEW YORK, N. Y.

ELECTRIC LOCOMOTION.

SPECIFICATION forming part of Letters Patent No. 628,968, dated July 18, 1899.

Application filed August 31, 1897. Serial No. 650,147. (No model.)

*To all whom it may concern:*

Be it known that I, HENRY VAN HOEVENBERGH, a citizen of the United States, and a resident of New York, county of New York, and State of New York, have invented certain new and useful Improvements in Electric Locomotion, of which the following is a specification.

This invention relates to trolleys or current-collectors for collecting current from supply-conductors and leading the same to electrically-propelled vehicles. The device is particularly adapted for service with motor-carriages, stages, or other vehicles adapted to run on roadways not provided with railway-tracks of the kind described in a prior application filed by me November 12, 1896, Serial No. 612,803. In devices of this character in which the trolley or current-collector is towed along the conductor by the driven vehicle it frequently happens, as when the vehicle suddenly increases in speed, thereby jerking the trolley, or when the collector runs along a downward incline of the conductor, that the trolley runs ahead of the vehicle, creating a slack in the towing cord or conductor, and is given a sudden jerk when such slack is again taken up by movement of the vehicle, creating a tendency to tear it away from the conductor or to interfere with its effective operation. My present improvements are directed to the cure of this difficulty. In carrying them out I provide the trolley with a brake controlled by the towing cord or conductor in such a way that the brake will be applied to retard the movement of the trolley when the towing-cord becomes slack. I effect this result by mounting a V-shaped brake shoe or block in coöperative relation to the trolley-wheels. The brake-shoe is spring-impelled and is connected with the towing-conductors in such a way that when the latter are taut the trolley-wheels are free to revolve, but when slackened the brake-shoe is forced by the spring against the wheel or wheels and the movement of the trolley impeded.

A further improvement consists in a rigid pivoted arm mounted on the lower part of the trolley-frame, to which the towing-conductors are secured, such arm acting to preserve the trolley in an upright position on the supply-conductor irrespectively of the position in the roadway occupied by the driven vehicle.

The several features of novelty will be more particularly hereinafter described and will be definitely indicated in the claims appended to this specification.

In the accompanying drawings, which illustrate the invention, Figure 1 is an end view, partly in section, of a trolley or current-collector embodying my improvements. Fig. 2 is a side elevation of the device shown in Fig. 1.

The trolley-frame is provided with two V-shaped arms or jaws, one of which, 2, is pivoted to the frame and the other of which, 1, is integral therewith or firmly secured thereto. On these arms, at their upper extremities, are journaled the trolley-wheels 3 4 $3^a$ $4^a$, set at an angle to each other, so as to meet upon and embrace part of a supply-conductor 5, upon which the trolley rolls. The pivoted arm is provided with a lug 6, and an extension of the frame carries a set-screw or key 7, by the adjustment of which the trolley may be locked upon the conductor or removed therefrom. The head of the screw is provided with a squared end to facilitate the use of a key mounted upon a staff. The brake-block 8, which is preferably provided with two V-shaped jaws, is pressed against the wheels by a leaf-spring 9, being secured to said spring at its center. One end of the spring may be secured to one of the pins, as $10^a$, to prevent forward thrust of the brake block 8. The ends of the spring bear upon studs 10 $10^a$, fixed to the trolley-frame. A cord or wire 11 is secured to the spring or brake-block and passes through a hole drilled in the downwardly-projecting part of the frame. Journaled upon said downwardly-projecting part of the frame is a lateral tubular arm 12, through which passes, but is insulated therefrom, the leading and towing conductors, which connect with the electric motor which drives the vehicle. The towing-conductor is preferably made in the form shown, comprising a central wire or wires 13, covered with a suitable insulating material and wound with a number of strands of fine wire, constituting the outer conductor 14. The conductor 13 is electrically connected with an insulated metal sleeve 15, which turns upon the projections of the frame, a washer 16 in contact therewith leading by a conductor to an insulated post 17, upon which is mounted an elastically-yielding arm 18, which carries a collector-roller 19, adapted to engage the return supply-conductor 20. The other conductor 14 is connected to the tube 12. The arm 18 is spring-controlled and is mounted in an insulated block 21, a coil-spring 22 having one terminal connected to the arm and the other terminal anchored in the insulating-block. The function of the elastically-yielding arm is the same as described in my prior application above referred to—namely, by folding in to permit the passage of an oppositely-moving trolley which rolls upon the companion conductor 20, continuity of connection with the driven motor being preserved by a metallic rail 21 in electric connection with the trolley-frame, which during the moment of passage of two oppositely-moving trolleys comes into contact with the roller of the yielding arm. The twin conductor, which leads from the trolley to the motor, is bent or flexed, as shown at 22, a cord 23 being connected to a slide 24, mounted upon the tube. This slide is connected by a link or cord 25 with a bell-crank lever 26, to which is secured the cord or wire 11, which controls the brake-block.

With this organization the operation is as follows: The parts below the trolley act as a counterbalance and maintain the trolley in an upright position, and the rigid arm 12 being able to swing over a complete circle tends to conserve its uprightness of position irrespective of the direction of draft of the towing-conductors. If the vehicle is running downhill and the trolley tends to move ahead by reason of the inclination of the supply-conductor, the slackness of the towing-conductor 22 permits the spring 9 to yield by drawing up the slide 24. The brake-shoes thus engage the trolley-wheels and arrest motion of the trolley. When the vehicle has moved forward sufficiently to again draw taut the towing-conductors, the brake-shoes will be withdrawn and the trolley permitted to follow the vehicle. Thus the trolley will always trail after the vehicle and will be continuously maintained in its best working position.

Having thus described my invention, what I claim as new, and desire to secure by Letters Patent, is—

1. A trolley or current-collector for electrically-propelled vehicles provided with an automatic brake capable of being set when the towing-conductor becomes slack.

2. A trolley or current-collector for electrically-propelled vehicles provided with a brake connected with and controlled by a flexible connection with the vehicle.

3. A trolley or current-collector for electrically-propelled vehicles provided with a brake-block, a flexible towing connection, and yielding connection between the two.

4. A trolley or current-collector for electrically-propelled vehicles provided with wheels to roll upon the upper conductor, a brake coöperative with the wheels, and a flexible towing connection with the vehicle adapted to release the brake when taut and set it when slack.

5. A trolley or current-collector for electrically-propelled vehicles provided with wheels set at an angle to engage a supply-wire, a spring-actuated brake-block adapted to engage both wheels, and a flexible connection with the vehicle controlling the action of the brake-block.

6. A trolley or current-collector for electrically-propelled vehicles provided with a spring-impelled brake adapted to arrest its movement along the supply-conductor, a flexible towing cord or conductor adapted to stretch when drawn taut, and connections with the towing cord or conductor for operating the brake.

7. A trolley or current-collector for electrically-propelled vehicles provided with a spring-impelled brake adapted to arrest its movement along the supply-conductor, and a vertically-pivoted arm beneath the trolley mounted to swing in a circle and maintain the trolley upright in all directions of strain substantially as described.

8. A trolley or current-collector for electrically-propelled vehicles provided with a spring-impelled brake adapted to arrest its movement along the supply-conductor, a vertically-pivoted arm beneath the trolley, a towing-cord connected to said arm, a yielding connection between the cord and arm, and connections with the brake for releasing it when the cord is drawn taut.

9. In a trolley or current-collector for electrically-propelled vehicles, the combination of wheels 3, 4, $3^a$, $4^a$, brake 8, arm 12, towing cord or conductor, lever 26 and connections between said lever and the brake and towing-cord.

10. A trolley or current-collector for electrically-propelled vehicles provided with a frame connected with one supply-conductor, an insulated electrically-yielding contact connecting with a companion supply-conductor, and a pivoted arm mounted on the trolley, connecting the trolley frame and contact by separate paths to two leading wires of the vehicle.

In testimony whereof I have hereunto subscribed my name this 18th day of August, A. D. 1897.

HENRY VAN HOEVENBERGH.

Witnesses:
LILLIAN M. BRUCE,
EMEROY B. CLIFFORD.